(12) United States Patent
Glenn (10) Patent No.: US 12,136,212 B2
(45) Date of Patent: Nov. 5, 2024

(54) MEASUREMENT OF PHYTOTOXICITY FROM IMAGERY (71) Applicant: Precision Silver LLC, Gainesville, FL (US)

(72) Inventor: Taylor Courtland Glenn, Newberry, FL (US)

(73) Assignee: PRECISION SILVER LLC, Gainesville, FL (US)

( * ) Notice: Subject to any disclaimer, the term of this patent is extended or adjusted under 35 U.S.C. 154(b) by 370 days.

(21) Appl. No.: 17/676,548

(22) Filed: Feb. 21, 2022

(65) Prior Publication Data
US 2022/0270250 A1 Aug. 25, 2022

Related U.S. Application Data (60) Provisional application No. 63/151,188, filed on Feb. 19, 2021.

(51) Int. Cl.
G06T 7/00 (2017.01)
G06V 10/82 (2022.01)
G06V 20/10 (2022.01)
G06V 20/70 (2022.01)

(52) U.S. Cl.
CPC ............ *G06T 7/0012* (2013.01); *G06V 10/82* (2022.01); *G06V 20/188* (2022.01); *G06V 20/70* (2022.01); *G06T 2207/10024* (2013.01); *G06T 2207/20081* (2013.01); *G06T 2207/20084* (2013.01); *G06T 2207/30188* (2013.01)

(58) Field of Classification Search
None
See application file for complete search history.

(56) References Cited

U.S. PATENT DOCUMENTS

2018/0077875 A1* 3/2018 Vander Velden ......... G06T 7/90

FOREIGN PATENT DOCUMENTS

| GB | 2598012 A * | 2/2022 | ........... A01B 79/005 |
| WO | WO-2010104848 A1 * | 9/2010 | ........ C12N 15/8273 |
| WO | WO-2013149038 A1 * | 10/2013 | ........... A61B 5/0077 |
| WO | WO-2022117772 A1 * | 6/2022 | ............. G06N 3/045 |

OTHER PUBLICATIONS

European and Mediterranean Plant Protection Organization "PP 1/135 (3) Efficacy evaluation of plant protection products Phytotoxicity assessment", EPPO Bulletin, Apr. 18, 2007, 7 pages, vol. 37, Issue 1, John Wiley & Sons, Inc.

* cited by examiner

Primary Examiner — Thomas D Lee
(74) Attorney, Agent, or Firm — Talem IP Law, LLP (57) ABSTRACT An assessment system receives color images of plants and produces rating values of chlorosis, necrosis, bleaching, stunting, deformations, and/or an overall general assessment of the plants. Phytotoxicity damage can be identified via the color images using pixelwise classifications from imagery of crop canopy into healthy, chlorotic, necrotic, and bleached classes.

18 Claims, 11 Drawing Sheets

Image of Treated Crops showing Phytotoxicity Symptoms

FIG. 7A

Image of Crops with Crop/Non-crop Segmentation Performed, and Crop Pixels Colored by Classes: Green=Healthy, Red=Necrotic, Yellow=Chlorotic, Blue=Bleached

FIG. 7B

- A: Phyto - Bleaching
- B: Phyto - Chlorosis
- C: Phyto - Necrosis
- D: Phyto - Stunting
- E: Phyto - Deformity
- F: Phyto - General Image of an ROI with Phytotoxicity Ratings of the Region Overlayed

FIG. 7C

Image of a Reference (Untreated Check) ROI

FIG. 8A

Image of Crops with in Reference ROI with Crop/Non-crop Segmentation Performed, and Crop Pixels Colored by Classes: Green=Healthy, Red=Necrotic, Yellow=Chlorotic, Blue=Bleached

MEASUREMENT OF PHYTOTOXICITY FROM IMAGERY

BACKGROUND

The chemical products applied to agricultural crops and other plants may cause damage known as phytotoxicity. In the research and development setting for developing new chemical products, researchers want to be able to measure how much phytotoxicity is being caused by a potential product. Normally this is done by an expert scientist going out in the field, visually assessing the plants and giving a manual rating based on their expert opinion of how much damage is present. This procedure is time consuming for the scientists, and it can often produce inconsistent ratings across multiple scientists.

BRIEF SUMMARY

Measurement of phytotoxicity from imagery is provided. An assessment system receives color images of plants and produces rating values of chlorosis, necrosis, bleaching, stunting, deformations, and/or an overall general assessment of the plants. The assessment system can use models generated through machine learning to identify symptoms of phytotoxicity. The results can be used to evaluate the effects of chemical products on plants.

Phytotoxicity damage can be identified via the color images using pixelwise classifications from imagery of crop canopy into healthy, chlorotic, necrotic, and bleached classes. Stunting assessments can be performed using heights determined by a photogrammetric model or lidar source. Deformations can be determined using a machine-learned function, for example, a learned image regression model based on a neural network architecture with inputs including the color images and a crop canopy segmentation mask. General phytotoxicity ratings can be computed using a (machine-learned) function to combine individual phytotoxicity symptoms (e.g., stunting, chlorosis, bleaching, necrosis, deformation) into a general assessment. For the general phytotoxicity ratings, an approach similar to that used for the deformations may be used (e.g., a learned image regression model).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Measurement of phytotoxicity from imagery is provided. An assessment system receives color images of plants and produces rating values of chlorosis, necrosis, bleaching, stunting, deformations, and/or an overall general assessment of the plants. The assessment system can use models generated through machine learning to identify symptoms of phytotoxicity. The results can be used to evaluate the effects of chemical products on plants.

Phytotoxicity refers to the damage or adverse effects on plants caused by a particular substance. Phytotoxicity can be characterized according to coloration and growth of the plant. For example, phytotoxicity symptoms may show up as leaf speckling, leaf margin necrosis (browning) or chlorosis (yellowing), brown or yellow leaf spots or patches, leaf cupping or twisting, plant stunting, and plant death. These symptoms of phytotoxicity can be measured via analysis of chlorosis, necrosis, bleaching, stunting, and deformations.

Chlorosis indicates an insufficient amount of chlorophyll is being produced and results in a pale, yellow, or yellow-white color. As chlorosis progresses, a bleaching effect can be seen. Chlorosis may involve both chlorophyll degradation and cell death, but these two effects can be independently induced. Necrosis indicates cell loss and causes plant tissue (e.g., leaves, stems and other parts) to darken (e.g., brown to black) and wilt.

Stunting refers to the reduction in foliage or yields or other abnormal growth resulting in dwarfing and loss of vigor (e.g., leaf area development and growth rate). Deformations include swelling, curling, wilting, stem deformations, twisting, crinkling, and failure to unroll.

Figure 1:
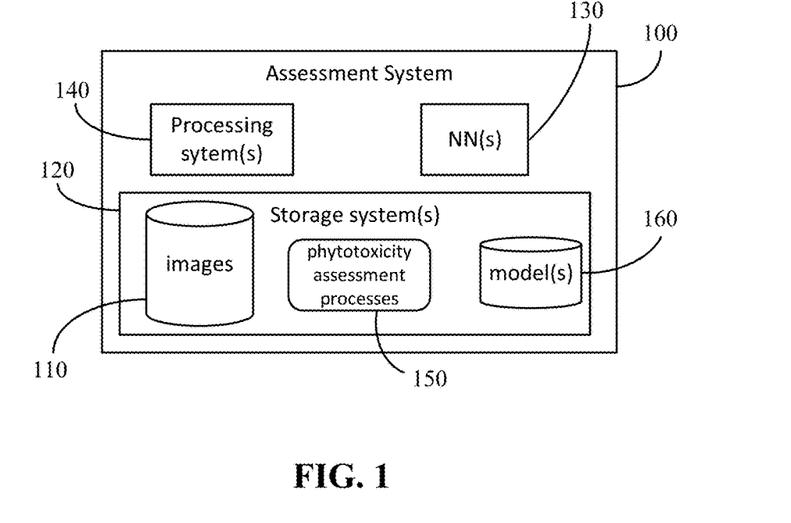
FIG. 1 illustrates an example assessment system architecture.

FIG. 1 illustrates an example assessment system architecture. Referring to FIG. 1, an assessment system 100 receives and processes imagery of plants from an image resource 110 that can store images captured by a drone, boom, cable mounted camera system or other system capable of obtaining an overhead view of plants. The image resource 110 can be a separate resource or part of a storage system 120 of the assessment system 100. Images can be uploaded or otherwise transferred from the camera systems directly or from a computing system associated with an entity managing the image capture that receives or retrieves the images from the camera systems. The assessment system performs phytotoxicity assessment using the images stored in the image resource 110 and includes one or more neural networks 130 and one or more processors 140. Storage system 120 can store instructions for phytotoxicity assessment processes 150 executed by the one or more processors 140 and/or neural networks 130 and store the models 160 used by the neural networks 130. In some cases, assessment system 100 may be implemented as computing system 1100 described with respect to FIG. 11B.

FIGS. 2A-2F illustrate various assessment system flows that can be carried out by an assessment system.

Figure 2A:
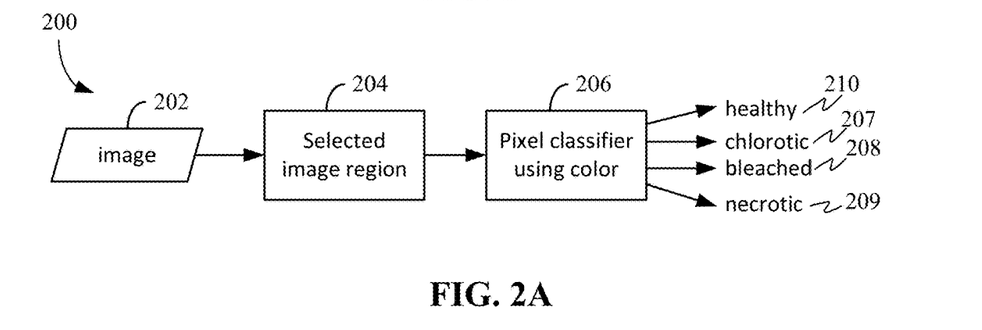
FIGS. 2A-2F illustrate various assessment system flows that can be carried out by an assessment system.

Referring to FIG. 2A, in process 200, phytotoxicity damage can be identified using pixelwise classifications from imagery of crop canopy into healthy, chlorotic, necrotic, and bleached classes. Here, from an image 202, a selected image region of interest 204 can be received at a pixel classifier 206, using color to label healthy 210 (e.g., green), chlorotic 207 (e.g., yellow), bleached 208 (e.g., blue/white), and necrotic 209 (e.g., red) pixels. The classifier 206 may use a model such as illustrated and described with respect to FIG. 9.

Figure 2B:
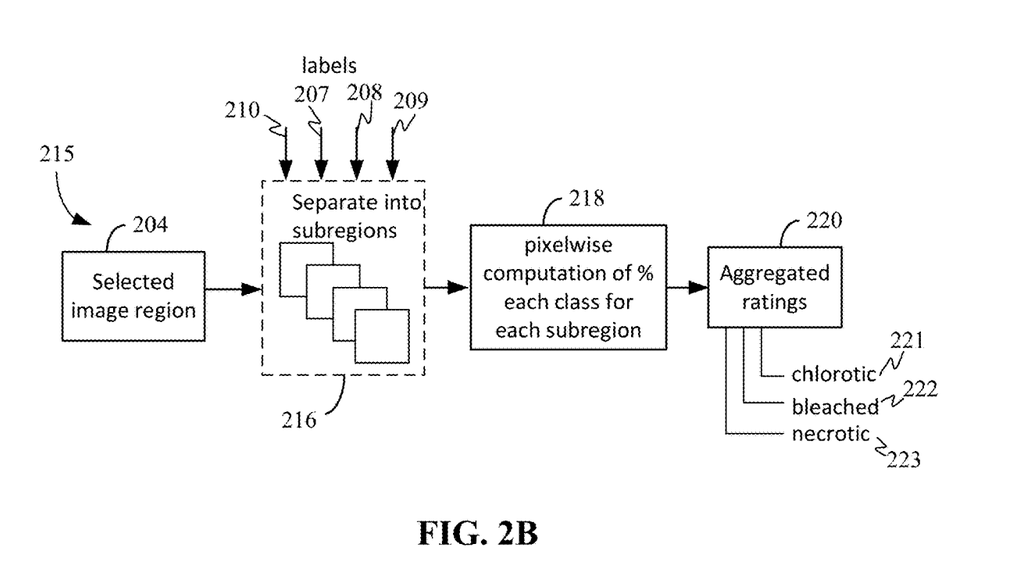
Figure 2C:
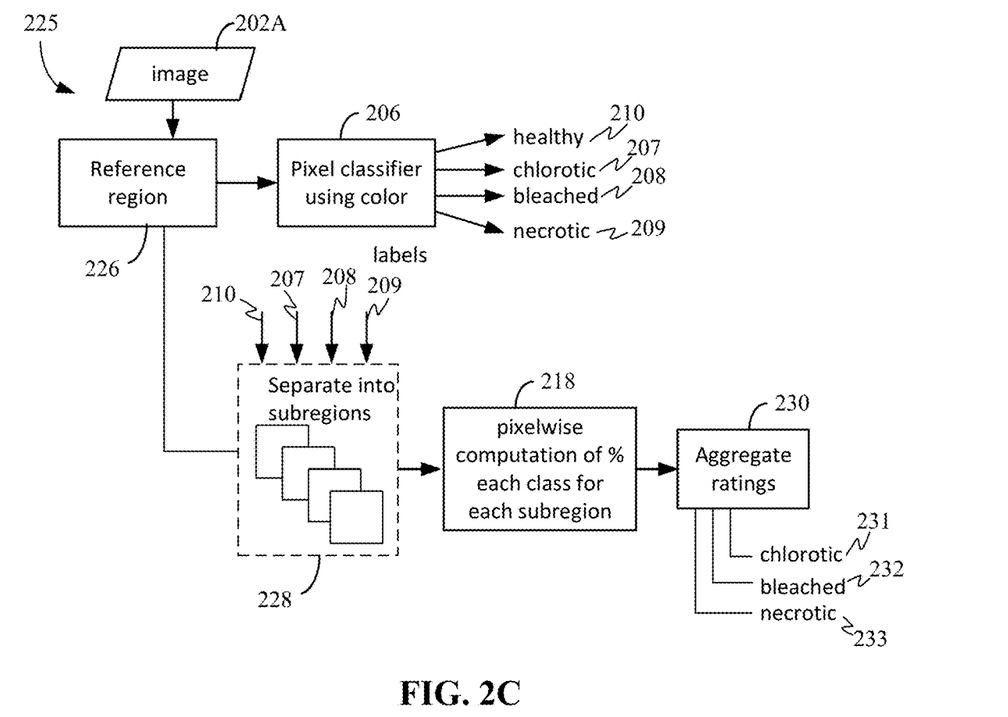

Referring to FIG. 2B, in process 215, initial (raw') ratings for chlorosis, bleaching and necrosis can be computed by first separating the selected region of interest 204 into subregions 216 and performing 218 pixelwise computation of percent (or proportion to vegetation) of each damage-related class (chlorotic 207, bleached 208, necrotic 209) for each subregion. Aggregated ratings are calculated 220 to produce a raw chlorotic rating 221, a raw bleached rating 222, and a raw necrotic rating 223. The total raw ratings of chlorotic 221, bleached 222, and necrotic 223 for the region of interest can be calculated across the subregions using, for example, the arithmetic mean, median value, or alpha-trimmed mean.

Reference ratings can be obtained following similar processes as performed on the region of interest. For example, referring to FIG. 2C, in process 225, from a same or different image 202A, a reference region 226 can be identified and the pixels classified using pixel classifier 206 to label healthy 210 (e.g., green), chlorotic 207 (e.g., yellow), bleached 208 (e.g., blue/white), and necrotic 209 (e.g., red) pixels. Subregions 228 of the reference region are evaluated by perform 218 pixelwise computation of percent (or proportion to vegetation) of each damage-related class (chlorotic 207, bleached 208, necrotic 209) for each subregion and aggregated ratings are calculated 230 to produce a reference chlorotic rating 231, a reference bleached rating 232, and a reference necrotic rating 233.

Figure 2D:
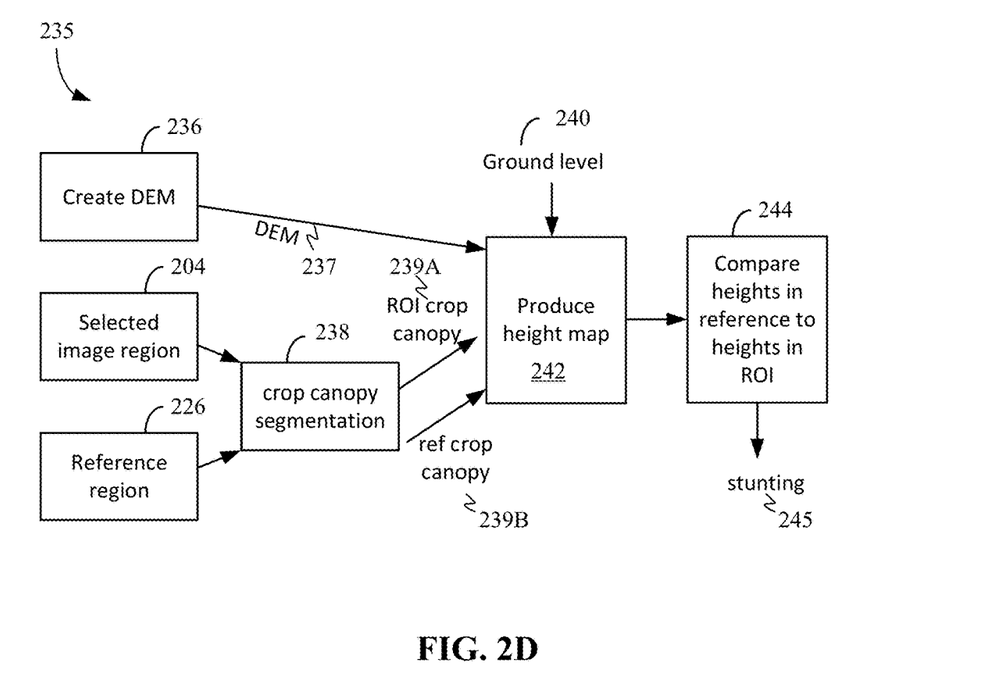

Referring to FIG. 2D, in process 235, a stunting determination can be performed after creation of a digital elevation model (DEM) 236. The DEM can be created using measurements of the ground taken by a lidar sensor that may be associated with an imaging platform (see FIG. 3) or from lidar data resources, for example as available from the US Geological Survey. In scenarios where lidar sensor data is not available, DEM may be created from topographic maps. In some cases, previously created DEM may be stored and accessed by a system performing process 235. In process 235, crop canopy segmentation 238 is performed on the selected region of interest 204 and the reference region 226 to identify the region of interest (ROI) crop canopy 239A and reference crop canopy 239B, respectively. The DEM 237, information on the ROI crop canopy 239A, information on the reference crop canopy 239B, and a ground level 240 identified from an earlier bare-soil flight or by fitting a plane/surface to visible soil regions in an image from which the region of interest was selected can be used to produce height maps 242. A comparison 244 of the peak heights (e.g., peak of leaf heights) in the region of interest to the reference region results in the stunting value 245.

Figure 2E:
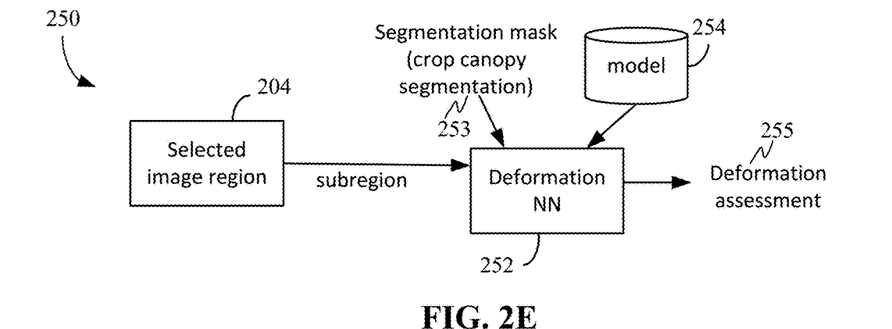

Referring to FIG. 2E, in process 250, deformation can be assessed using a neural network 252 that receives input of at least a subregion of the selected image region 204, segmentation mask 253 (to indicate vegetation) and a deformation model 254 to generate a deformation assessment 255. In an example implementation, the neural network 252 can be a convolutional neural network (CNN) and the deformation model 254 can be a learned image regression model.

Figure 2F:
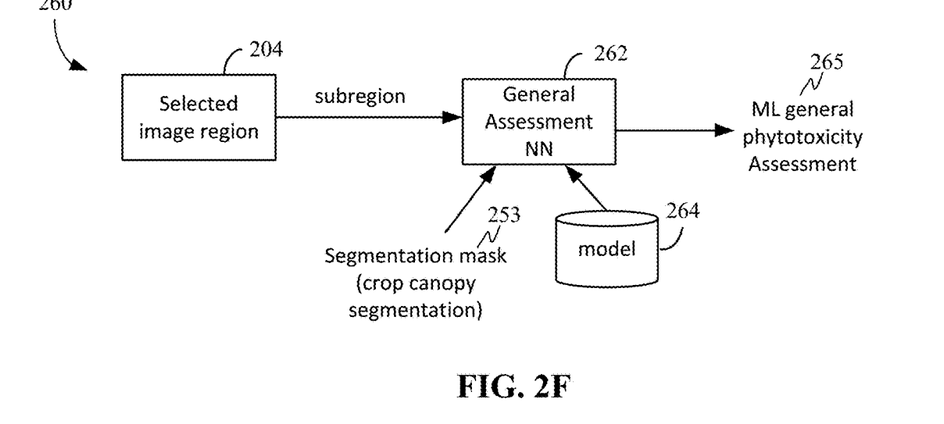

Referring to FIG. 2F, in process 260, general phytotoxicity can be assessed using a general assessment neural network 262 that receives input of at least a subregion of the selected image region 204, segmentation mask 253 (to indicate vegetation) and a model 264 to generate a ML general phytotoxicity assessment 265. In an example implementation, the general assessment neural network 262 can be a CNN and the model 263 can be a learned image regression model.

For reference ratings of deformation and general phytotoxicity, the reference region 226 can be input to the neural network used for deformation (deformation NN 252) and the neural network used for general phytotoxicity assessment (general assessment NN 262). Final ratings of chlorosis, necrosis, bleaching, deformation, and general phytotoxicity can be produced by comparing chlorotic rating 221, bleached rating 222, necrotic rating 223, deformation rating assessment 255, and general phytotoxicity rating 265 to the reference chlorotic rating 231, reference bleached rating 232, reference necrotic rating 233, reference deformation rating (which may be generated using process 250 but with reference region 226), and reference general phytotoxicity rating (which may be generated using process 260 but with reference region 226), respectively. The final values can be the difference between the two.

Figure 3:
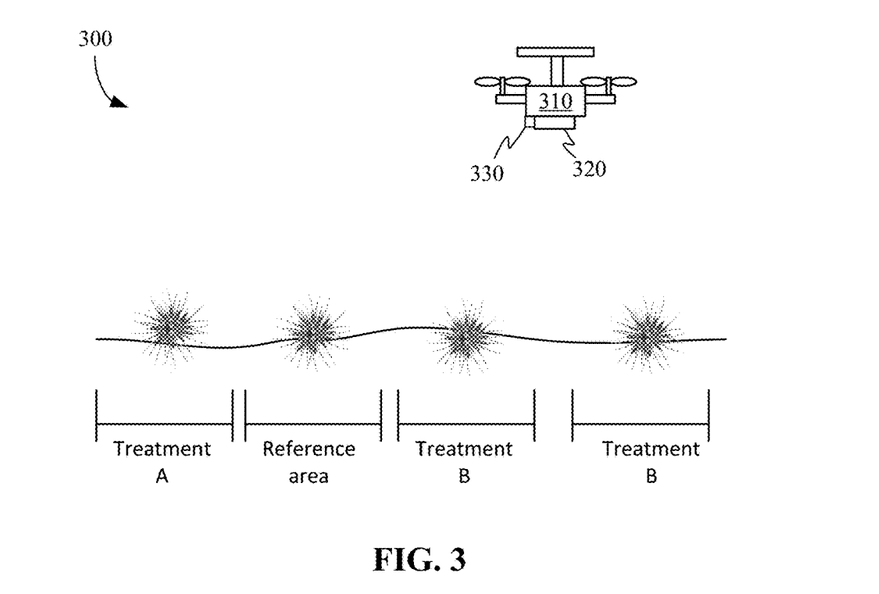
FIG. 3 illustrates an example scenario for acquisition of images that can be used by the phytotoxicity assessment system.

FIG. 3 illustrates an example scenario for acquisition of images that can be used by the phytotoxicity assessment system. Referring to FIG. 3, a scenario 300 can involve an imaging platform 310 with a nadir facing camera 320 that takes an overhead view of plants that are being evaluated for phytotoxicity. In some cases, the imaging platform 310 can include a lidar sensor 330 for facilitating creation of a DEM.

As shown in the scenario 300, various sections of a field may be treated with different chemicals and a phytotoxicity evaluation is desired. Here, two types of treatments (Treatment A, Treatment B) and a Reference area (e.g., that is untreated or has a control treatment applied) are shown. Images can be taken over time and evaluated using the phytotoxicity assessment system such as described herein in order to provide data on effects of the treatments.

The imaging platform 310 may be, for example, an unmanned aerial vehicle (UAV), ground vehicle, or handheld device. An example of a UAV may be a multi-rotor helicopter drone. In the example implementation of FIG. 3, the imaging platform 310 is a drone that flies over a region of interest to capture image data using the camera 320. The camera 320 can capture a single picture, or a series of pictures. The number of pictures captured is dependent on several factors, such as the size of the region of interest, the altitude of the drone implementing the imaging platform 310, and the characteristics of the particular camera 320, such as field of view. The image data from the camera 320 is of the area of interest. The number of images that are taken is based on the ability of the camera to capture an image of the area that needs to be covered while still providing a desired resolution. For example, it may be desirable to have a resolution such that a pixel can correspond to an area of 2 $cm^2$. When multiple images are taken in order to cover the area of interest, such as a field, the images can be stitched together using any suitable program. For example, photogrammetry software programs are available for stitching together images obtained via cameras on drones.

Figure 4:
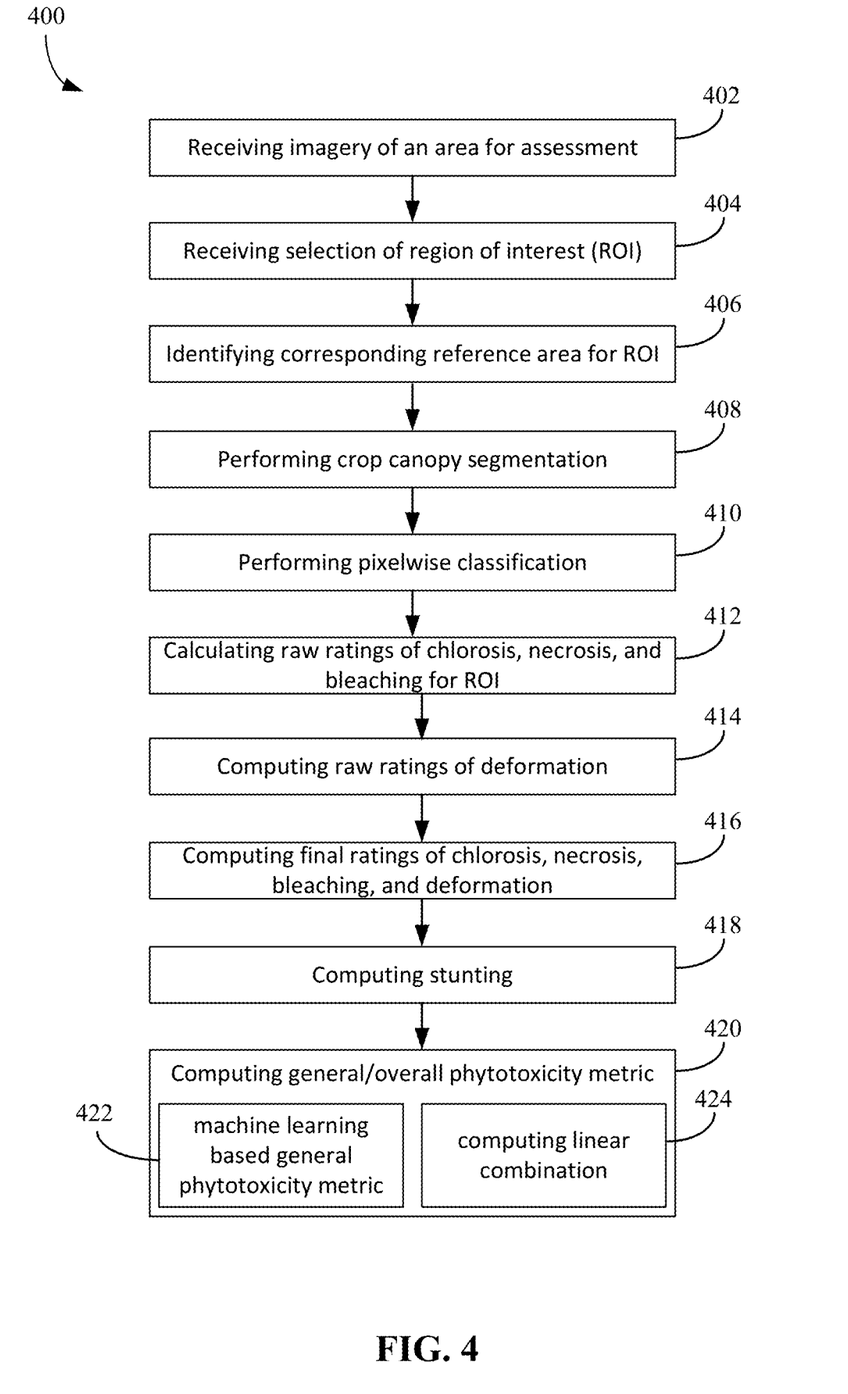
FIG. 4 illustrates an example process flow diagram of a phytotoxicity assessment.

FIG. 4 illustrates an example process flow diagram of a phytotoxicity assessment. Referring to FIG. 4, an example process 400 includes receiving (402) imagery of an area for assessment. The imagery may be acquired using a nadir facing camera to obtain an overhead view of plants. For example, from a drone (e.g., as shown in FIG. 3), boom, or cable mounted camera system. The acquired imagery, for example of color images, may be directly transmitted to the assessment system or captured and then transmitted to the assessment system (e.g., via an upload process). Depending on the area to be captured and the type of camera and lens used when acquiring the imagery (and the images sent to the assessment system), the assessment system may include a pre-processing feature to make image mosaics from the received images and alternatively or in addition, may include a pre-processing feature to generate digital elevation maps. These pre-processing features can be performed using available photogrammetry software.

In some cases, a viewer interface (see e.g., description of FIG. 10) is provided such that an image of an area received by the assessment system can be viewed at a user's computing device and various tools provided for navigation of the image and evaluation of the phytotoxicity of the plants in the image. For example, a user can select one or more regions of interest and indicate what phytotoxicity metrics to show. The selection may be possible via a lasso tool or other selection command.

Returning to process 400, a selected region of interest (ROI) can be received (404) by the assessment system and the assessment system can identify (406) the corresponding reference area for the selected ROI. The reference area is an area of the same or a different image, which can function as a control. For example, as illustrated in FIG. 3, certain sections of a field can be left untreated or applied with a known composition as a comparison for the selected ROI. Images of these sections may be labeled as reference regions.

A crop canopy segmentation (408) is performed for the selected ROI. A machine learning based model or other method may be used to perform the crop canopy segmentation. The crop canopy segmentation (408) involves labeling each pixel in the selected ROI as either being part of the crop canopy or not. Non-canopy pixels may be, for example, soil, non-crop vegetation like weeds, or other materials (e.g., trash, fencing, etc.). For the pixels labeled as part of the crop canopy, a pixelwise classification (410) can be performed to identify pixels corresponding to healthy vegetation, chlorotic vegetation, bleached vegetation, or necrotic vegetation. The classification method can classify (and label) each picture based on its color and involve any suitable classifier, for example, a support vector machine or a K nearest-neighbor method. Raw ratings of chlorosis, necrosis, and bleaching can then be calculated (412). The raw rating of chlorosis can be obtained by calculating the proportion of the total vegetation pixels in an area that are classified as chlorotic, the raw rating of necrosis can be obtained by calculating the proportion of the total vegetation pixels in the area that are classified as necrotic, and the raw rating of bleaching can be obtained by calculating the proportion of the total vegetation pixels in the area that are classified as bleached. In some cases, the raw ratings can be first computed in subregions of the region of interest, such as along a planted row, and then the total raw rating for the region of interest can be calculated across the subregions using, for example, the arithmetic mean, median value, or alpha-trimmed mean. A subregion may correspond to units of area such as a square meter or square foot along a row. The use of subregions is advantageous, particularly where there are a range of growth and toxicity patterns. Indeed, aggregating pixelwise over an entire region of interest can in certain scenarios yield poor results due to the changing size of affected vegetation across subregions. In some cases, the above processes can be carried out as described with respect to the process flows of FIGS. 2A-2C.

Raw ratings of deformation can be computed (414). The raw values of deformation may be computed using a using a learned image regression model, for example based on a convolution neural network (CNN) architecture. During raw value computation, inputs to the model may include the RGB imagery of a subset of the ROI (example 1 meter along the row by 1 meter wide), and a crop canopy segmentation mask to show which pixels are part of the crop to be measured. During training, pre-labeled images can be used to identify appropriate features. In some cases, the raw ratings of deformation can be determined as described with respect to the process flow of FIG. 2E Final ratings of chlorosis, necrosis, bleaching, and deformation can be computed (416) by comparing the "raw" ratings on each ROI to the raw ratings of the corresponding reference area.

Stunting can be computed (418) by measuring the height of plants from DEM data and comparing the heights values measured from the DEM data for the ROI with the reference area. The ground level can be identified from an earlier bare-soil flight or by fitting a plane/surface to visible soil regions in the ROI or immediate surroundings and a top of the canopy level can be identified from pixels labeled as being part of the crop canopy. From this information, a height map can be produced for the region of interest and the reference region. From the height map, it is possible to find peak of leaf heights to determine plant heights in the region of interest. A comparison of the peak heights (e.g., peak of leaf heights) in the two maps results in the stunting value. For example, the stunting values may be produced by subtracting the reference area's raw value from the ROI's raw value. In some cases, the stunting metric is computed based on a comparison of volume or volume under canopy. For example, the stunting values may be produced by summing the heights of all crop canopy pixels in the region and multiplying by their pixel area to produce a volume measure for the crop canopy in the (sub) region of interest. The volume measure for the region of interest can then be compared to the volume of the reference region (e.g., by subtracting or taking the ratio) to produce a measure of stunting. Advantageously, the stunting assessment is possible by comparing heights (and/or volumes) in the ROI to a reference "check" value where heights are determined by automated measurements from a photogrammetric model or lidar source. In some cases, stunting can be determined as described with respect to the process flow of FIG. 2D.

A general and/or overall phytotoxicity metric for each ROI can be computed (420). In some cases, a machine-learning-based general phytotoxicity assessment is performed (422). In some cases, a linear combination is computed (424). In some cases, both types of metrics are provided.

For performing (422) the machine-learning-based general phytotoxicity assessment, raw values of the region of interest (and the corresponding reference area) can be computed using a learned image regression model, for example based on a CNN architecture using the same inputs as the deformation model, for example, the RGB imagery of a subset of the ROI and a crop canopy segmentation mask to show which pixels are part of the crop to be measured. As with the deformation model, the general phytotoxicity assessment model can be trained on pre-labeled images. Final ratings for the general phytotoxicity assessment can be computed by comparing the "raw" ratings for the general phytotoxicity on each ROI to the raw ratings of the corresponding reference area. In some cases, the machine-learning-based general phytotoxicity can be carried out as described with respect to the process flow of FIG. 2F.

For computing the linear combination (424), an "overall" phytotoxicity metric for each ROI can be computed by a combination of the chlorosis, necrosis, bleaching, stunting, deformation, and ML-general ratings (or any subset of the ratings). For example a linear combination of the values with a maximum value of 1.0 may be computed as overall=min (1.0, 0.45 stunting+0.66 chlorosis+0.53 necrosis+0.55 bleaching+0.46 deformation).

Figure 10:
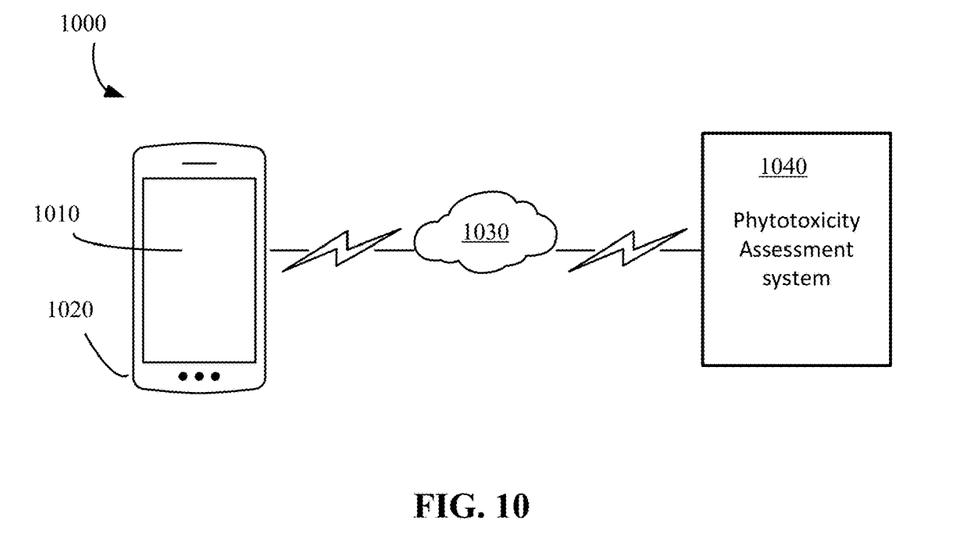
FIG. 10 shows an example implementation of a viewing platform.

After computing the phytotoxicity ratings, the resulting measurements can be delivered to the customer in spreadsheet (.csv) form, or displayed in an interactive viewer application (e.g., such as described with respect to FIG. 10).

Figure 5:
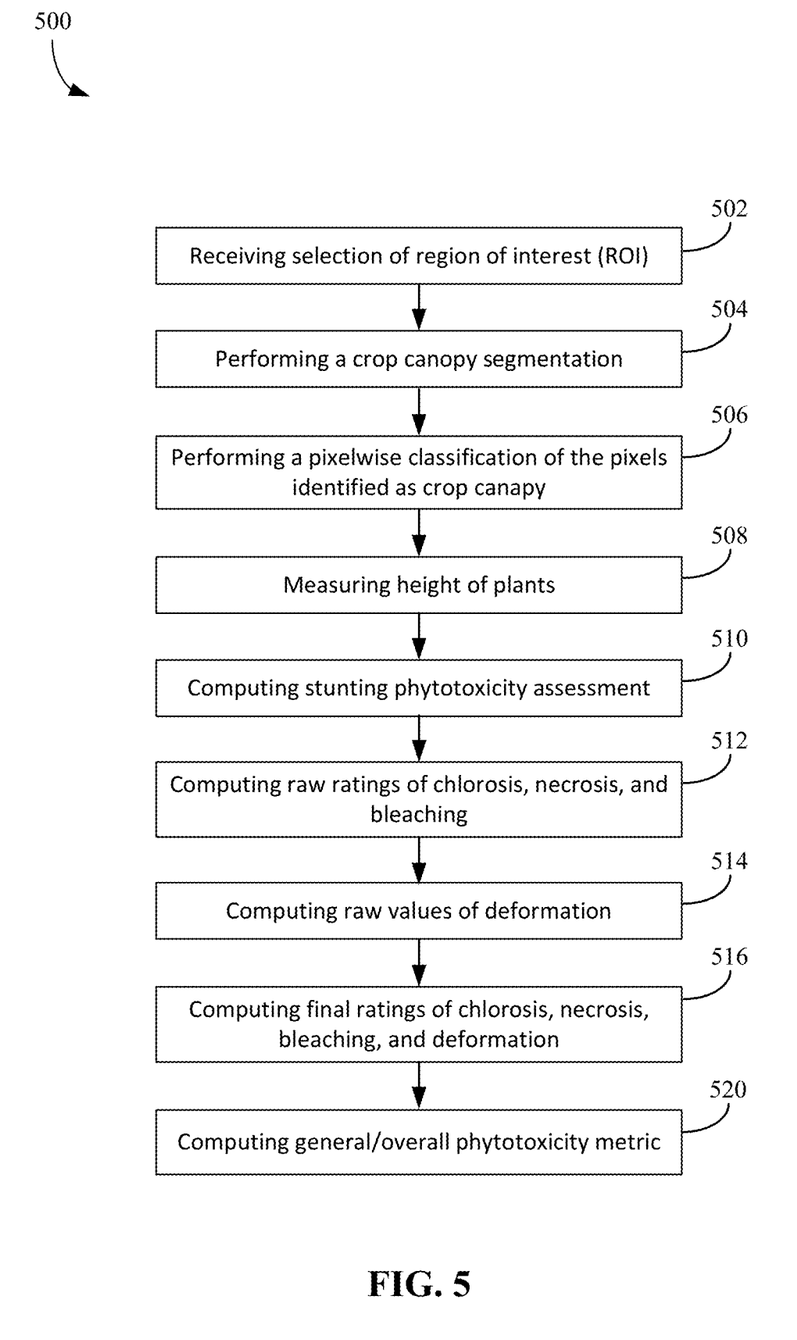
FIG. 5 shows an example process of phytotoxicity assessment.

FIG. 5 shows an example process of phytotoxicity assessment. Referring to FIG. 5, a method 500 of phytotoxicity assessment can include receiving (502) a selection of a region of interest in an overhead image view of plants; performing (504) a crop canopy segmentation by labeling each pixel of an image within the region of interest as either being part of a crop canopy or not part of the crop canopy (pixels labeled as being part of the crop canopy are vegetation pixels); performing (506) a pixelwise classification of the pixels labeled as being part of the crop canopy to identify which pixels belong to which of a plurality of phytotoxicity health classes comprising healthy, chlorosis, bleaching, and necrosis; measuring (508) height of plants in the region of interest from a digital elevation map associated with the overhead image view of the plants; computing (510) a stunting phytotoxicity assessment by comparing the plant heights or volume to a height or volume value in a reference area; computing (512) raw ratings of chlorosis, necrosis, and bleaching for the region of interest; computing (514) raw values of deformation; computing (516) raw values of a general phytotoxicity assessment; computing (518) final ratings of chlorosis, necrosis, bleaching, deformation, and general phytotoxicity assessment by comparing the raw ratings of chlorosis, necrosis, and bleaching, the raw values of deformation, and the raw values of general phytotoxicity on each region of interest to computed ratings of the corresponding reference area; and computing (520) an overall phytotoxicity metric for each region of interest by a combination of two or more of the final ratings for chlorosis, necrosis, bleaching, deformation, and general phytotoxicity. Certain aspects of these processes may be carried out as described with respect to FIGS. 2A-2F and FIG. 4.

Figure 6:
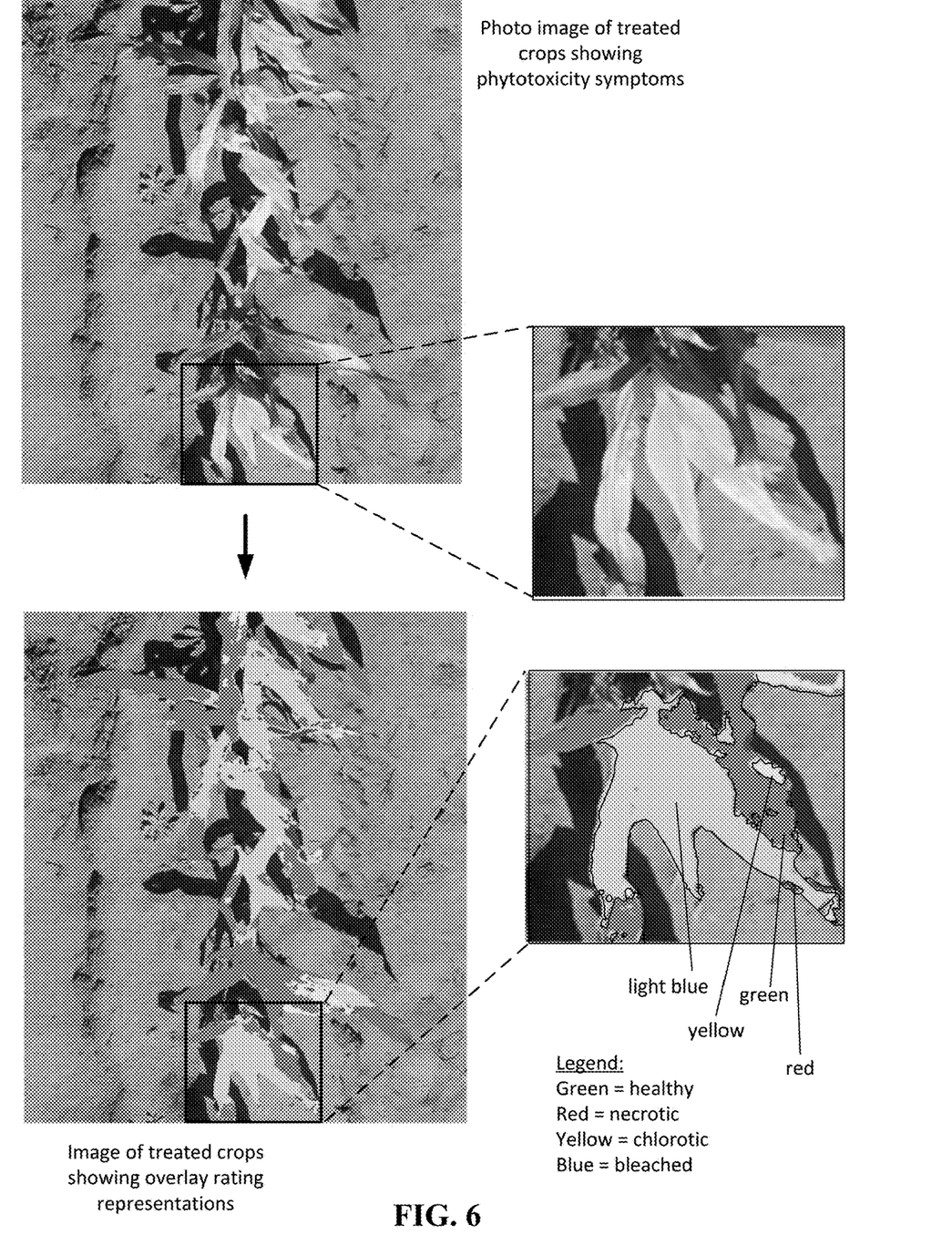
FIG. 6 illustrates coloration of images for providing phytotoxicity assessment.

FIG. 6 illustrates coloration of images for providing phytotoxicity assessment. As can be seen, a photo image of treated crops showing phytotoxicity symptoms can be colorized showing overlay rating representations with pixels colored green for healthy, red for necrotic, yellow for chlorotic, and blue for bleached.

Figure 7A:
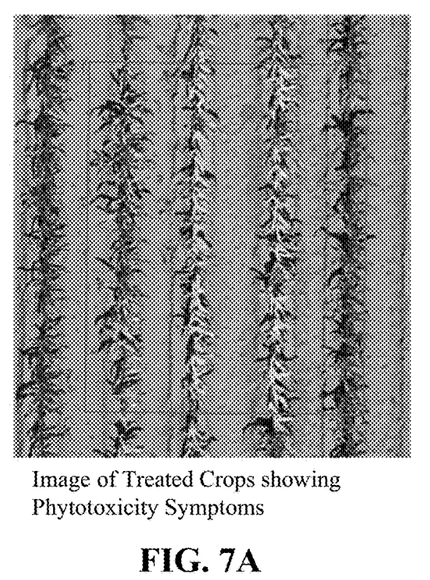
FIGS. 7A-7C illustrate example views of the crops and associated coloration and ratings available in a viewer.
Figure 7B:
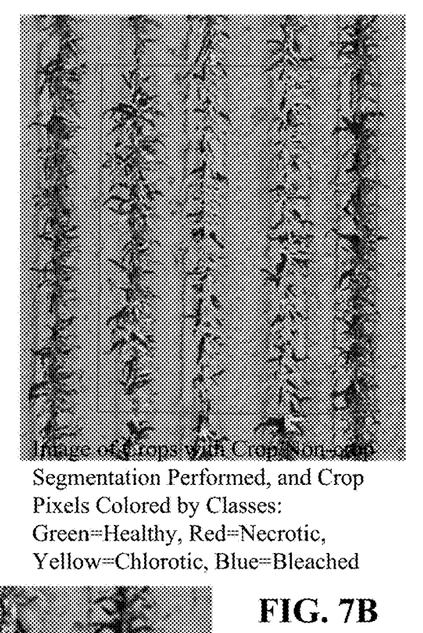
Figure 7C:
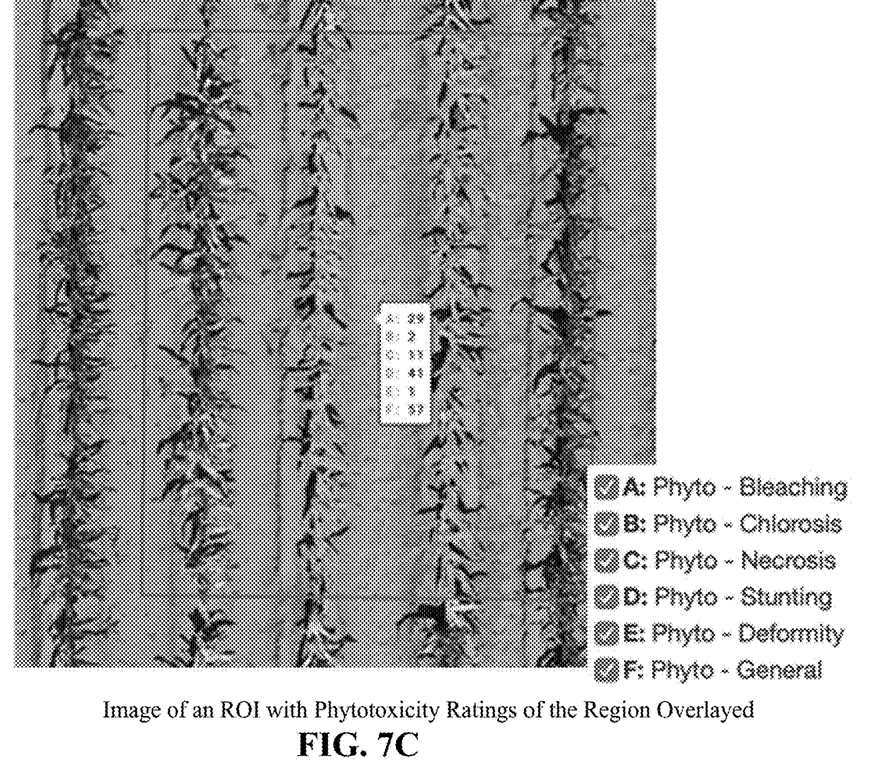

FIGS. 7A-7C illustrate example views of the crops and associated coloration and ratings available in a viewer. FIG. 7A shows an image of treated crops showing phytotoxicity symptoms. FIG. 7B shows the image of treated crops with coloration applied according to how each pixel is classified. Here, colors have been assigned to the identified pixels belonging to the plurality of phytotoxicity health classes and the overhead image view of the plants can be provided for display with the identified pixels having the assigned colors. FIG. 7C shows the image of treated crops with the coloration and a legend providing the ratings for the region of interest. Here, bleaching is 29, chlorosis is 2, necrosis is 11, stunting is 41, deformity is 1, and a general assessment is 57, all out of a scale of 0 to 100. These values can be considered final ratings (and may be provided in the interface in response to a received request).

Figure 8A:
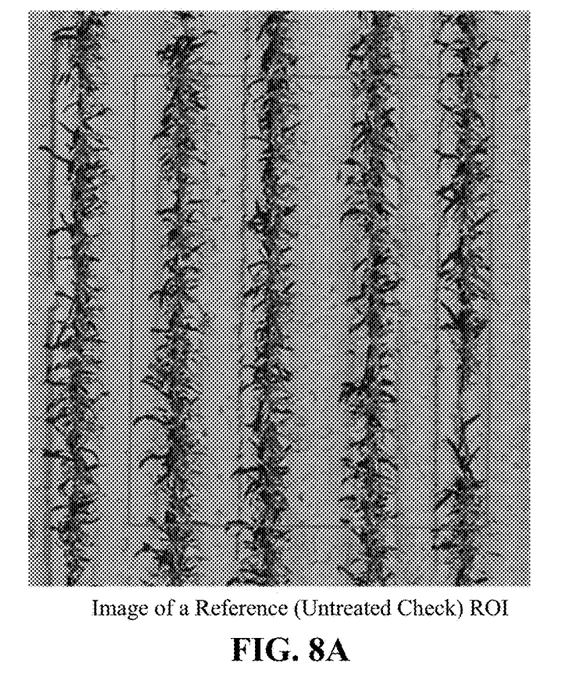
FIG. 8A shows an image of a reference region.
Figure 8B:
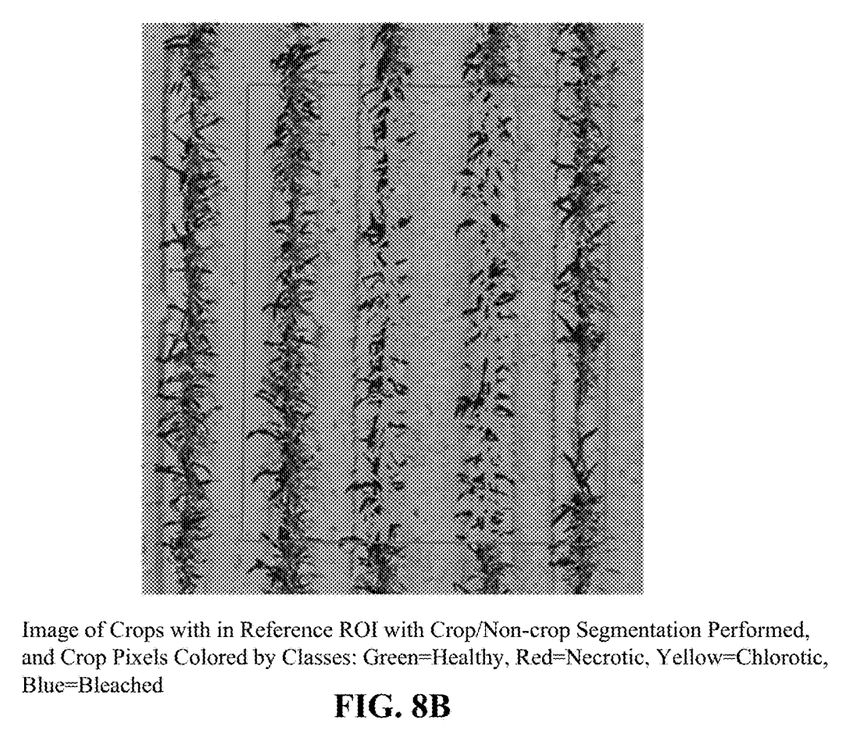
FIG. 8B shows coloration according to classification.

FIG. 8A shows an image of a reference region; and FIG. 8B shows coloration according to classification. In this example, the image is of an untreated check region of interest. FIG. 8A shows the image with a box around the region of interest. FIG. 8B shows the result after crop/non-crop segmentation is performed and the crop pixels are colored by classes. The overlay of the colored pixels shows mostly healthy.

Figure 9:
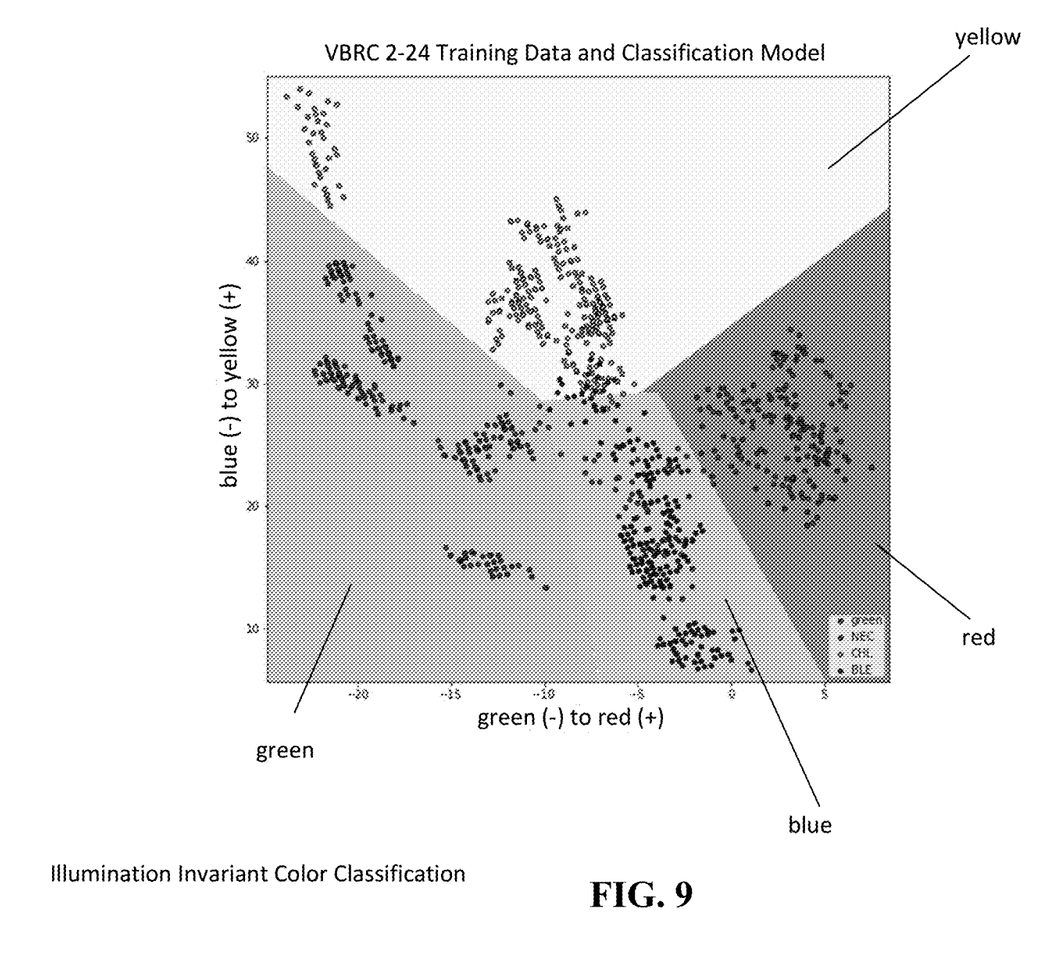
FIG. 9 shows a representation of a model used in one implementation of a classification method for classifying pixels as chlorotic, necrotic, bleached, and healthy.

FIG. 9 shows a representation of a model used in one implementation of a classification method for classifying pixels as chlorotic, necrotic, bleached, and healthy. The figure involves an illumination invariant color space; CIE L*a*b or CIE L*u*v* could be used and color formats RGB or CMYK or other color format could be used. Here, A and B are two kinds of color aspects of the color and L is the lightness of the color. The x-axis shows the A channel aspect of the color on a green to red scale with negative numbers being green and positive numbers being red. The y-axis shows the B channel aspect of the color on a blue to yellow scale with negative numbers being blue and positive numbers being yellow.

Training data of hand labeled images were used to generate the model with the learned boundaries (data points of training set are shown in the figure), indicating the color classification of each pixel. The bottom left is a green shaded region and pixels that fall within the values of the two color channels of that region are classified as healthy. Pixels that fall in the red region will be classified/labeled as necrotic, pixels that fall in the yellow region will be classified/labeled as chlorotic, and pixels that fall in the bottom center blue region will be classified/labeled as bleached.

FIG. 10 shows an example implementation of a viewing environment for obtaining and viewing results of a phytotoxicity assessment. The viewing environment 1000 may include a viewing application 1010 installed on a viewing device 1020. The viewing device 1020 may be connected, via a wired or wireless network connection 1030, to a network on which an assessment system 1040 can be accessed. The assessment system may be implemented such as described in FIG. 11B. In some cases, viewing application 1010 communicates with the assessment system 1040 via one or more application programming interfaces. The viewing application 1010 can be, for example, a web browser, a mobile app, or a desktop app. The viewing device can be, for example, a laptop computer, a desktop computer, or a hand-held mobile device such as a smartphone or tablet, or any other device with an associated display screen capable of displaying phytotoxicity-related images. The viewing application 1010 can include a graphical user interface with menu commands and selector tools, capable of displaying any of the example images shown in FIGS. 6, 7A-7C and 8A-8B.

Figure 11A:
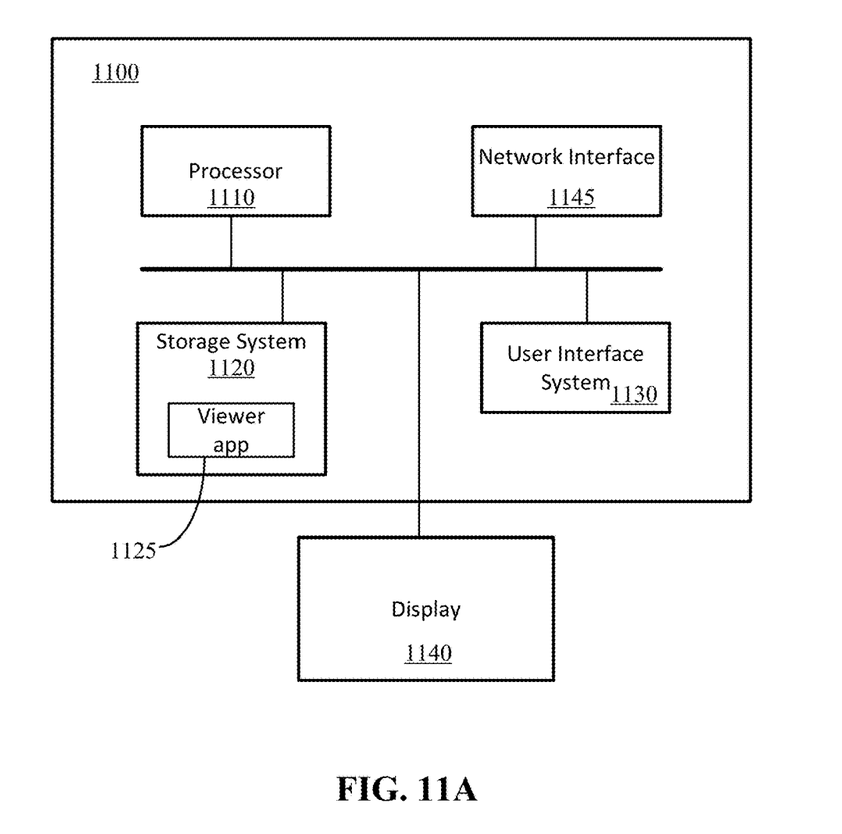
FIG. 11A illustrates an example computing device that may be used to implement a viewer.

FIG. 11A illustrates an example computing device that may be used to implement a viewer. Referring to FIG. 11A, a computing device 1100 can include a processor 1110, storage system 1120, user interface system 1130, display 1140, and network interface 1145. The storage system 1120 can store instructions for a viewer application 1125 (e.g., application 1010 of FIG. 10 or web browser, which can be executed by the processor 1110. A user can interact with the viewer application 1125 via the user interface system 1130 and view images and graphical user interfaces via the display 1140. The network interface 1145 can be used to communicate with other devices, including an assessment system and storage for images over a network such as the Internet.

Figure 11B:
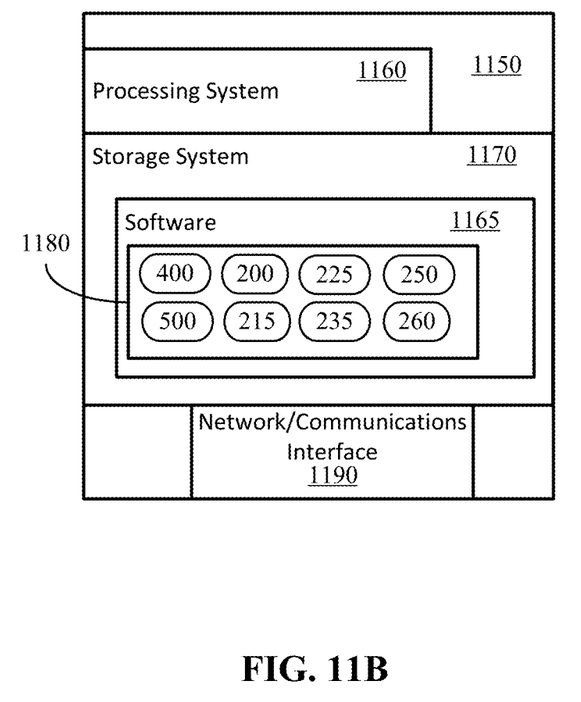
FIG. 11B shows an example computing system that may be used to carry out methods described herein.

FIG. 11B shows an example computing system that may be used to carry out methods described herein. Referring to FIG. 11B, system 1150 may be implemented within a single computing device or distributed across multiple computing devices or sub-systems that cooperate in executing program instructions. Accordingly, more or fewer elements described with respect to system 1150 may be incorporated to implement a particular system. The system 1150 can include one or more blade server devices, standalone server devices, personal computers, routers, hubs, switches, bridges, firewall devices, intrusion detection devices, mainframe computers, network-attached storage devices, and other types of computing devices.

In embodiments where the system 1150 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

System 1150 can include processing system 1160 of one or more processors to transform or manipulate data according to the instructions of software 1165 stored on a storage system 1170. Examples of processors of the processing system 1160 include general purpose central processing units (CPUs), graphics processing units (GPUs), field programmable gate arrays (FPGAs), application specific processors, and logic devices, as well as any other type of processing device, combinations, or variations thereof.

Software 1165 can include an operating system and application programs 1180, which may carry out methods 200, 215, 225, 235, 250, 260, 400, and 500 such as described with respect to FIGS. 2A-2F, 4, and 5. Application programs 1180 may further include software supporting a viewer that can be accessed such as described with respect to FIG. 10.

Storage system 1170 may comprise any suitable computer readable storage media. Storage system 1170 may include volatile and nonvolatile memories, removable and non-removable media implemented in any method or technology for storage of information, such as computer readable instructions, data structures, program modules, or other data. Examples of storage media of storage system 1170 include random access memory, read only memory, magnetic disks, optical disks, CDs, DVDs, flash memory, magnetic cassettes, magnetic tape, magnetic disk storage or other magnetic storage devices, or any other suitable storage media. In no case do storage media consist of transitory, propagating signals.

Storage system 1170 may be implemented as a single storage device but may also be implemented across multiple storage devices or sub-systems co-located or distributed relative to each other. Storage system 1170 may include additional elements, such as a controller, capable of communicating with processing system 1160.

Network interface 1190 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the operating system, which informs applications of communications events when necessary.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain Embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for phytotoxicity assessment, comprising:
receiving a selection of a region of interest in an overhead image view of plants;
performing a crop canopy segmentation by labeling each pixel of an image within the region of interest as either being part of a crop canopy or not part of the crop canopy;
performing a pixelwise classification of the pixels labeled as being part of the crop canopy to identify which pixels belong to which of a plurality of phytotoxicity health classes comprising healthy, chlorosis, bleaching, and necrosis;
measuring height of plants in the region of interest from a digital elevation map associated with the overhead image view of the plants;

computing a stunting phytotoxicity assessment by comparing the measured heights or an associated volume to a height or volume value in a reference area;

computing raw ratings of chlorosis, necrosis, and bleaching for the region of interest;

computing raw values of deformation;

computing raw values of a general phytotoxicity assessment;

computing final ratings of chlorosis, necrosis, bleaching, deformation, and general phytotoxicity assessment by comparing the raw ratings of chlorosis, necrosis, and bleaching, the raw values of deformation, and the raw values of general phytotoxicity on each region of interest to corresponding computed ratings of the reference area;

computing an overall phytotoxicity metric for each region of interest by a combination of two or more of the final ratings for chlorosis, necrosis, bleaching, deformation, and general phytotoxicity; and transmitting one or more resulting measurements of final ratings of chlorosis, necrosis, bleaching, deformation, general phytotoxicity assessment, and the overall phytotoxicity metric to an interactive viewer application according to a received request.

2. The method of claim 1, wherein the crop canopy segmentation is performed using a machine learning based model.

3. The method of claim 1, wherein the pixelwise classification of the pixels labeled as being part of the crop canopy uses illumination invariant color space.

4. The method of claim 1, wherein measuring the height of the plants comprises:
identifying a ground level from an earlier bare-soil flight or by fitting plane/surface to visible soil regions in the region of interest or immediate surroundings;
identifying a top level of the crop canopy from pixels labeled as being part of the crop canopy;
subtracting the ground level from the top level of the crop canopy level to produce a height map; and
from the height map, finding peak of leaf heights to determine plant heights in the region of interest.

5. The method of claim 1, wherein computing raw values of deformation comprises using a learned image regression model based on a convolutional neural network (CNN) architecture with inputs comprising RGB imagery of a subset of the region of interest and a crop canopy segmentation mask to indicate which pixels are part of the plants to be measured.

6. The method of claim 5, wherein the subset of the region of interest is a 1 meter by 1 meter section along a row of vegetation.

7. The method of claim 1, wherein the raw rating of chlorosis is calculated as a proportion of a total number of vegetation pixels labeled as part of the crop canopy in the region of interest that are classified as chlorotic, wherein the raw rating of necrosis is calculated as a proportion of the total number of vegetation pixels labeled as part of the crop canopy in the region of interest that are classified as necrotic, and wherein the raw rating of bleaching is calculated as a proportion of the total number of vegetation pixels labeled as part of the crop canopy in the region of interest that are classified as bleached.

8. The method of claim 7, wherein the raw ratings of chlorosis, necrosis, and bleaching are first performed with respect to each subregion of the region of interest and then ratings of the subregions are aggregated.

9. The method of claim 8, wherein the aggregation of ratings of subregions is performed using arithmetic mean, median value, or alpha-trimmed mean.

10. The method of claim 1, wherein computing the raw values of the general phytotoxicity assessment comprises using a learned image regression model based on a convolutional neural network (CNN) architecture with inputs comprising RGB imagery of a subset of the region of interest and a crop canopy segmentation mask to show which pixels are part of the plants to be measured.

11. The method of claim 1, wherein computing the final ratings comprises subtracting the reference area's raw value from the region of interest's raw value for each of chlorosis, necrosis, bleaching, deformation, and general phytotoxicity.

12. The method of claim 1, wherein the overall phytotoxicity metric is given as overall=min (1.0, 0.45 stunting+ 0.66 chlorosis+0.53 necrosis+0.55 bleaching+0.46 deformation).

13. A computer readable storage medium having instructions stored thereon that when executed by a computing system direct the computing system to:
receive a selection of a region of interest in an overhead image view of plants in a color image;
perform a crop canopy segmentation by labeling each pixel of the color image within the region of interest as either being part of a crop canopy or not part of the crop canopy;
perform a pixelwise classification of the pixels labeled as being part of the crop canopy to identify which pixels belong to which of a plurality of phytotoxicity health classes comprising healthy, chlorosis, bleaching, and necrosis;
assign colors to the identified pixels belonging to the plurality of phytotoxicity health classes;
provide for display the overhead image view of plants with the identified pixels having the assigned colors;
calculate a raw chlorosis rating as a proportion of a total number of vegetation pixels labeled as part of the crop canopy in the region of interest that are classified as chlorotic;
calculate a raw necrosis rating as a proportion of the total number of vegetation pixels labeled as part of the crop canopy in the region of interest that are classified as necrotic;
calculate a raw bleaching rating as a proportion of the total number of vegetation pixels labeled as part of the crop canopy in the region of interest that are classified as bleached;
calculate a reference raw chlorosis rating as a proportion of a total number of vegetation pixels labeled as part of the crop canopy in a reference region that are classified as chlorotic;
calculate a reference raw necrosis rating as a proportion of the total number of vegetation pixels labeled as part of the crop canopy in the reference region that are classified as necrotic;
calculate a reference raw bleaching rating as a proportion of the total number of vegetation pixels labeled as part of the crop canopy in the reference region that are classified as bleached;
compute final ratings of chlorosis, necrosis, and bleaching by comparing the raw ratings of chlorosis, necrosis, and bleaching on each region of interest to the reference raw ratings of chlorosis, necrosis, and bleaching of the reference region; and
provide the final ratings for display according to a received request.

14. The computer readable storage medium of claim 13, wherein the crop canopy segmentation is performed using a machine learning based model.

15. The computer readable storage medium of claim 13, wherein the pixelwise classification of the pixels labeled as being part of the crop canopy uses illumination invariant color space.

16. The computer readable storage medium of claim 13, further comprising further instructions stored thereon that when executed by the computing system direct the computing system to:
  compute raw values of deformation by using a learned image regression model based on a convolutional neural network (CNN) architecture with inputs comprising RGB imagery of a subset of the region of interest and a crop canopy segmentation mask to indicate which pixels are part of the plants to be measured.

17. The computer readable storage medium of claim 13, further comprising further instructions stored thereon that when executed by the computing system direct the computing system to:
  compute a general phytotoxicity assessment by using a learned image regression model based on a convolutional neural network (CNN) architecture with inputs comprising RGB imagery of a subset of the region of interest and a crop canopy segmentation mask to show which pixels are part of the plants to be measured.

18. A computer readable storage medium having instructions stored thereon that when executed by a computing system direct the computing system to:
  receive a selection of a region of interest in an overhead image view of plants in a color image;
  perform a crop canopy segmentation by labeling each pixel of the color image within the region of interest as either being part of a crop canopy or not part of the crop canopy;
  perform a pixelwise classification of the pixels labeled as being part of the crop canopy to identify which pixels belong to which of a plurality of phytotoxicity health classes comprising healthy, chlorosis, bleaching, and necrosis;
  measure height of plants in the region of interest from a digital elevation map associated with the overhead image view of the plants;
  calculate a stunting phytotoxicity assessment by comparing the measured heights or an associated volume to a height or volume value in a reference area;
  assign colors to the identified pixels belonging to the plurality of phytotoxicity health classes; and
  provide for display the overhead image view of plants with the identified pixels having the assigned colors.

* * * * *